(12) United States Patent
Palmer et al.

(10) Patent No.: US 7,883,646 B2
(45) Date of Patent: *Feb. 8, 2011

(54) THIXOTROPIC, POROUS, CHEMILUMINESCENT REACTANT COMPOSITION

(75) Inventors: William R. Palmer, Rescue, CA (US); Stephen L. Palmer, Cameron Park, CA (US)

(73) Assignee: Cyalume Technologies, Inc., West Springfield, MA (US)

( * ) Notice: Subject to any disclaimer, the term of this patent is extended or adjusted under 35 U.S.C. 154(b) by 587 days.

This patent is subject to a terminal disclaimer.

(21) Appl. No.: 10/508,384

(22) PCT Filed: Mar. 17, 2003

(86) PCT No.: PCT/US03/08443

§ 371 (c)(1),
(2), (4) Date: Sep. 20, 2004

(87) PCT Pub. No.: WO03/080756

PCT Pub. Date: Oct. 2, 2003

(65) Prior Publication Data

US 2005/0161646 A1    Jul. 28, 2005

Related U.S. Application Data

(60) Provisional application No. 60/366,287, filed on Mar. 20, 2002.

(51) Int. Cl.
C09K 3/00 (2006.01)
C09K 11/00 (2006.01)
F21K 2/06 (2006.01)

(52) U.S. Cl. .......................... 252/700; 362/34; 362/84; 273/DIG. 24

(58) Field of Classification Search ................ 252/700; 362/34, 84, 159, 64; 222/94; 273/DIG. 24

See application file for complete search history.

(56) References Cited

U.S. PATENT DOCUMENTS

| 3,583,927 | A |   | 6/1971 | Schlesinger |
| 3,671,450 | A |   | 6/1972 | Rauhut et al. |
| 3,774,022 | A | * | 11/1973 | Dubrow et al. ............... 252/700 |
| 3,808,414 | A |   | 4/1974 | Roberts |
| 3,816,325 | A |   | 6/1974 | Rauhut et al. |
| 4,814,949 | A |   | 3/1989 | Elliott |
| 5,158,349 | A |   | 10/1992 | Holland et al. |
| 5,173,218 | A |   | 12/1992 | Cohen et al. |
| 2003/0155560 | A1 | * | 8/2003 | Palmer et al. ............... 252/700 |
| 2010/0047497 | A1 | * | 2/2010 | Palmer et al. ............... 252/700 |

FOREIGN PATENT DOCUMENTS

| EP | 0316546 | 5/1989 |
| EP | 0663560 | 7/1995 |

* cited by examiner

*Primary Examiner*—Daniel S Metzmaier
(74) *Attorney, Agent, or Firm*—McHale & Slavin, P.A.

(57) ABSTRACT

The thixotropic composition of the instant invention may be cured to a more or less rigid form without the use of a mold. The shaped thixotropic composition includes one of the two components which when combined result in chemiluminescent light. The cured solid is useful in a variety of environments and will emit chemiluminescent light upon addition of a second chemiluminescent component.

19 Claims, No Drawings

THIXOTROPIC, POROUS, CHEMILUMINESCENT REACTANT COMPOSITION

RELATED APPLICATIONS

This application claims priority based on U.S. Provisional application 60/366,287, filed Mar. 20, 2002, the contents of which is incorporated herein by reference.

FIELD OF THE INVENTION

This invention is directed toward the field of chemiluminescent compositions and more particularly, to devices which produce light from an immobilized chemiluminescent material.

BACKGROUND OF THE INVENTION

Chemiluminescent light production generally utilizes a two-component system to chemically generate light. Chemiluminescent light is produced by combining the two components, which are usually in the form of chemical solutions referred to as the "oxalate" component and the "activator" component. All suitable oxalate and activator compositions, inclusive of the various additional fluorescers, catalysts and the like, known to be useful in the prior art, are contemplated for use within the present invention.

The term "chemiluminescent reactant", "chemiluminescently reactive" or "chemiluminescent reactant composition" is interpreted to mean a mixture or component thereof which will result in chemiluminescent light production when reacted with other necessary reactants in the processes as disclosed herein.

The term "fluorescent compound" is interpreted to mean a compound which fluoresces in a chemiluminescent reaction, or a compound which fluoresces in a chemiluminescent reaction.

The term "chemiluminescent composition" is interpreted to mean a mixture which will result in chemiluminescence.

The term "thixotropic composition" is interpreted to mean an admixture which behaves as a pseudo fluid when force is applied to it, but has properties of a solid when at rest.

The two components are kept physically separated prior to activation by a variety of means. Often, a sealed, frangible, glass vial containing one component is housed within an outer flexible container containing the other component. This outer container is sealed to contain both the second component and the filled, frangible vial. Forces created by intimate contact with the internal vial, e.g. by flexing, cause the vial to rupture, thereby releasing the first component, allowing the first and second components to mix and produce light. Since the objective of this type of device is to produce usable light output, the outer vessel is usually composed of a clear or translucent material, such as polyethylene or polypropylene, which permits the light produced by the chemiluminescent system to be transmitted through the vessel walls. These devices may be designed so as to transmit a variety of colors by either the addition of a dye or fluorescent compound to one or both of the chemiluminescent reactant compositions or to the vessel itself. Furthermore, the device may be modified so as to only transmit light from particularly chosen portions thereof.

It is desirable to produce chemiluminescent light from objects of various shapes or forms. U.S. Pat. No. 4,814,949 issued to Elliott discloses a means of making shaped, two-dimensional, chemiluminescent objects. Conventional liquid, chemiluminescent reagents are combined to produce light. A non-woven, absorbent article in the desired shape is permitted to absorb the chemiluminescent reagents after mixing and activation so that the article emits light from the shape desired. Although the shape may be as simple or as complex as desired, it is essentially limited to a two-dimensional surface and is additionally limited to producing a single color of light per device.

An example of creating a chemiluminescent system capable of producing light from a swellable polymeric composition is disclosed in U.S. Pat. No. 3,816,325 issued to Rauhut et al. Two primary means are employed to produce solid chemiluminescent systems. The first system relies on diffusion of a chemiluminescent oxalate solution into a solid polymer substrate such as a length of flexible vinyl tubing. The diffusion process occurs when a length of the vinyl tubing is immersed in a suitable chemiluminescent reagent for an extended period of time. After removal of the tubing from the oxalate solution, application of liquid activator to the surface of the tubing causes the tubing to emit light. Since the solid polymer is relatively non-porous, it is difficult to rapidly and completely activate the oxalate in the tubing because the relatively slow process of diffusion must also be relied upon to permit the activator solution to reach the chemiluminescent reagent diffused into the polymer before light can be generated.

In a further embodiment of U.S. Pat. No. 3,816,325, the chemiluminescent oxalate solution is mixed with a polyvinyl chloride (PVC) resin powder to form a paste, which is then spread on a substrate and baked in an oven to form a flexible, elastic film. While this embodiment is operative, the polyvinyl chloride sheet described exhibits weaknesses in uniformity, strength, flexibility, and most importantly, porosity. Additionally, the processes described are primarily suitable for producing relatively thin objects only and, extensive testing has determined that the formulations of '325 are entirely unsuitable for processes which may be desired to produce graphic patterns such as screen printing and coating applications. Additionally, there is no mention of using thixotropic compositions to produce graphic patterns. Further, there is no mention of using thixotropic chemiluminescent compositions to produce graphic patterns which are capable of producing light of various colors simultaneously.

U.S. Pat. No. 5,173,218 to Cohen et al. discloses a combination of PVC polymer resins to produce a porous, flexible, chemiluminescent structure from liquid slurries. Although an improvement in the art, the products produced still suffer from a variety of shortcomings, particularly if solid, chemiluminescent objects are to be produced which are other than relatively flat, thin objects. A thin "pad" is produced from a mixture of polymer resins, which is strong and flexible, and exhibits satisfactory absorptive properties of the activator fluid. However, the processes taught focus on producing pads which are made by pouring a liquid slurry mixture into molds. As such, the slurry and hence, the resulting pad shape, is limited to the shape of the mold, into which the slurry is poured and pools. Additionally, it is well-known to those skilled in the art that the formulas and processes utilized in the prior art may produce chemiluminescent pads with a relatively tough and impermeable "skin"-wherever the slurry has been in contact with the mold during the baking process. This skin is easily recognized as a darker and more transparent region of the pad and is highly impermeable. Consequently, it is incapable of rapidly absorbing liquid activator solution and as such, minimally contributes to light output of the device. The thickness of this skin varies with the time and temperature of the baking process, but in any event, this skin represents wasted material from which little usable light may be produced. It has been determined that this skin is created by an inability of the slurry to draw in air (or other gasses) during the baking process. To achieve a significantly porous product, air must enter the slurry mixture during the baking process from the exposed surfaces of the slurry pool. During the curing process, air is usually drawn into the pad to replace the volume occupied by solvents which become absorbed into the PVC resins. This process continues as air is drawn down to ever increasing depths within the pad as first the upper regions of the pad cure and then successively lower regions of the pad cure. It is this inclusion of air into the pad during the baking process which primarily determines the percent of open pore space and hence adsorptiveness of the pad. At some point during the baking process described, the bottom of the mold may reach a temperature at which the slurry mixture in contact with this region of the mold begins to jell and cure, even though an air path from the exposed surfaces of the slurry to this lower region may not have been created. Due to a lack of air available to this jelling slurry, this "bottom up" curing process results in a pad which is tough, dense, and virtually non-porous in the region of the pad proximal to the mold bottom and to a lesser extent, the mold edges. Certain adverse effects of this bottom up curing process can be minimized if the bottom of the mold is placed on a cold thermal mass in the curing oven, thereby providing for heating and curing of the bottom portion of the slurry following the remainder of the slurry. Nonetheless, the undesirable production of a tough and impermeable skin layer remains unaddressed. The process taught in '218 is an improvement over prior art but there is still no means taught to produce graphic patterns from the materials described in the '218 patent. Since the material employed to produce chemiluminescent pads in '218 is a pourable liquid, it must necessarily be cast into some sort of a mold or other containing means in order to produce any predetermined shaped pad. The mixtures taught in '218 are also entirely unsuitable for use in producing graphic patterns or any detail such as may be produced using screen printing processes and the like.

Another attempt to produce multi-colored chemiluminescent devices relies either on various optical filters or secondary fluorescers to alter the color of light produced in a liquid chemiluminescent system. Such attempts are unsatisfactory in that the number and quality of colors which may be filtered from light produced in a liquid chemiluminescent is very limited. Attempts at this often involve application of a colored decal or other filtering means to the outer surface of a conventional light stick. Other attempts at producing multi-colored chemiluminescent devices employing liquids rely on secondary fluorescers. Such fluorescers can for example, convert green light which is produced by a chemiluminescent reaction to red light. Stoke's law limits this conversion process to producing only those wavelengths of light which are lower than that of the original light. Additionally, these conversion processes are typically inefficient and waste significant amounts of optical energy. Further, the prior art fails to contemplate a product which may be independent of a container, and which is capable of generating a plurality of spatially separated colors or wavelengths of chemiluminescent light simultaneously over a planar surface.

SUMMARY OF THE INVENTION

The instant invention teaches a means to produce solid, objects which are self-illuminated. The objects may be as simple or as complex as desired. The objects are produced by a method employing a thixotropic, chemiluminescent reactant composition. This composition is of such a nature that it may be readily placed using a variety of means and then cured whereupon the composition becomes solid. Once formed, the composition is semi-rigid and may be placed in any desired orientation with respect to gravity without substantial deformation of the composition. Additionally, the instant invention provides for a chemiluminescent reactant composition which is exceptionally porous and which does not require trays or molds to contain it, as is the case in prior art. Also, objects created by means of the instant invention may be readily produced in various thicknesses as may be desired to control light generation. Further, these objects may be multi-colored, that is, a single object can be created which is capable of simultaneously generating a plurality of spatially separated colors or wavelengths of chemiluminescent light.

A fundamental objective of the instant invention is that the thixotropic chemiluminescent material may be readily fixed in place without the need for molds or trays to create graphics and other indicia as may be desired. As such, the system is not limited to the defining shape of molds but may be readily formed into practically any shape desired. Such forming means include but are not limited to screen printing, and other means of producing coatings such as coating processes employing "doctor" blades and the like.

Accordingly, it is an objective of the instant invention to provide for a means to produce objects which are capable of self-illumination through chemiluminescence and which objects may generate a plurality of spatially separated colors or wavelengths simultaneously.

It is yet another objective of the instant invention to provide for three-dimensional chemiluminescent objects which have little or no dark regions due to "skin" effect caused by improper curing.

It is yet another objective of the instant invention to provide for a formulation for a chemiluminescent reactant composition which is thixotropic and as such, may be readily placed or formed into a desired shape either with or without the use of a mold or form during the curing process.

Other objectives and advantages of this invention will become apparent from the following description including reference by way of illustration and example.

DETAILED DESCRIPTION OF THE INVENTION

The present invention is directed toward a formulation and process of making a chemiluminescent reactant composition which is thixotropic, and may be used to produce chemiluminescent objects which are capable of producing a plurality of colors of light which are spatially separated. This composition overcomes weaknesses of the prior art and implements the use of a novel placement process to be applied to a chemiluminescent material, thereby furnishing a uniquely formed, chemiluminescent object. The process of the instant invention is not limited to the conventional casting process which produces objects which emit only a single color of light per object, described in the prior art.

The thixotropic composition of the instant invention may be readily formed to the desired shape, and upon heat curing, forms a relatively strong, flexible, and highly porous mass. The viscosity of the material may be controlled by the exact formulation of the composition to facilitate material handling and placement. Additionally, because the mass when cured is tough and flexible, it may be bent or formed as may be desired to conform to nearly any conceivable shape. This is particularly useful in that it may be desirable to place the thixotropic composition on a flat or flexible substrate such as a plastic or balloon sheet or the like. This substrate which now holds the thixotropic composition is then exposed to heat which cures the composition whereupon the composition is converted into a strong, flexible mass. Now, the substrate and the cured mass may, be cut into various shaped pieces and flexed or rolled into a shape which may for example, be inserted into a cylindrical container. For example, a chemiluminescent light stick could be produced using the means of the instant invention in which a substrate has deposited and cured on its surface three bands of different color producing chemiluminescent reagents. The substrate is then cut to the desired size and rolled to form a hollow tube. This tube may then be inserted into a cylindrical plastic tube or casing. Also contained with the casing is a frangible ampule such as a glass vial or rupturable pouch containing a liquid activator. When an activator reagent is added to this casing the three different chemiluminescent reagents produce three distinct color bands, thereby yielding a three-colored light stick. A variety of methods exists with respect as to how to deposit the thixotropic chemiluminescent mixture onto a substrate. For example, a "doctor" blade system may be employed to spread layers of the thixotropic material onto the substrate. Another means to distribute the thixotropic mixture onto a substrate is to employ screen printing processes. Typically screen printing employs a woven screen in which certain parts of the screen are masked or closed off with a stencil. These stencils are commonly produced using photosensitive materials and as such nearly any graphic pattern may be "burned" into the stencil. When an ink or other material is wiped across the surface of the screen, a portion of the material is forced through the open areas in the stencil and is deposited onto a substrate which is in close proximity to the screen and which comes into contact with the screen during the printing process. The exact thickness of the deposit is a function of the screen mesh size and the thickness of the stencil as well as the flooding and printing technique. The product of the instant invention was found to be suitable for use with stencils including and exceeding those with a 750 micron thickness. It was found that none of the mixtures taught in either the '218 patent of the '325 patent were suitable for this process. Problems encountered when attempting to use the mixtures described in the prior art included screen plugging, failure of the screen to clear the mixtures, flattening out of any graphics or patterns due to low thixotropic properties, and a general difficulty in processing the material. Additionally, the previously mentioned problems associated with low porosity and top down curing were observed when the mixtures of the prior art were employed.

After extensive experimentation, a range of processes and mixture of materials was developed which solved virtually all of the problems associated with previous attempts at producing multi-colored or other detailed graphic patterns employing chemiluminescent materials. The instant invention permits the accurate placement and formation of detailed graphics which can be caused to glow by the addition of an activator reagent. Said graphics may be of virtually any detail or complexity and may include any number of different color producing chemiluminescent mixtures which when activated will produce a plurality of spatially separated colors. Since some of the fluorescers used in the production of chemiluminescent formulations are highly mobile even when in solid solutions, it was found that in some cases it was additionally useful to employ some form of barrier to prevent migration of these fluorescers from one color region to another. Effective barrier methods included the use of a "high definition" screen printing ink, specifically designed to produce thick graphics. The use of these inks to print "key lines" between color regions effectively stopped all migration of fluorescers from one color region to another. Another simple means to prevent color migration is to provide for an air gap between colors. That is, a small gap or space is left between adjacent color spots so that there is no capillary path for fluorescer migration. While the exact width of this gap is dependent on the detail required in the graphic design, it was found that a gap of approximately $1/32$nd of an inch functioned well.

An example of a form which may be produced using the teaching of the instant invention is that of a graphic pattern such as a cartoon figure or corporate logo. By employing the instant invention these graphic patterns can be produced which emit light in any color desired or in any combination of colors or wavelengths from a single device.

Previous attempts at producing multi-colored chemiluminescent light sources have met with drawbacks. Typically, a chemiluminescent lighting device, such as a light stick, which employs liquids, must rely on physical barriers to maintain separation of the liquids which may be used to produce various colors of light. However, since the chemiluminescent product of the instant invention is a solid, it is self-containing and does not flow or move after curing.

A significant advantage of the instant invention over a fully liquid chemiluminescent system, such as that found in conventional light sticks, is that the entire surface of the object may be caused to glow if desired. Conventional light sticks always have some finite head space above the glowing. Said head space is either as a result of incomplete filling of the stick tube during manufacturing or, as a result of the generation of gasses during the chemiluminescent reaction. Since the chemiluminescent system in these types of light sticks is entirely liquid, this headspace is manifested as a bubble which makes the device appear to be underfilled. This is not an issue in the instant invention.

Since the resultant product of the instant invention is a solid chemiluminescent material, the product may be utilized in situations where it is impractical or impossible to use a liquid chemiluminescent system which is dependent upon its container.

A series of experiments were devised to identify optimal materials and formulas necessary to produce a formable, porous, chemiluminescent reactant composition.

A new formulation was created which utilized the preslurry described above by dissolving approximately 2 parts PVC resin (Geon Corp. #121) with 98 parts of an oxalate solution. Although in this example the liquid oxalate solution was propylene glycol dibenzoate based, any base compound in the art is contemplated. In this new formulation, a higher weight percent of a single PVC particle was used in place of the medium and large particle PVC resins employed in the slurries previously taught. Approximately 63 parts of preslurry were added to 37 parts of resin (Geon #466). The resulting composition was not a liquid slurry as in the prior art, but rather a viscous and highly thixotropic material. The resin should be selected so as to contain a particle size or range thereof sufficient to provide said thixotropic admixture. In an illustrative, albeit not limiting embodiment, this resin is a PVC resin having a mean particle size distribution of about 105 microns.

The thixotropic material of the resulting chemiluminescent reactant composition has a consistency similar to mashed potatoes.

The newly created formulation functioned exceptionally well when used in screen printing applications. Additionally, it was found that graphics produced with conventional screen printing inks could be combined with graphics produced with the thixotropic admixture for more striking graphic effects. For example, black "key lines" may be first printed on a clear or transparent substrate by a conventional screen printing process and then overlayed with graphic patterns comprised of various colors of the thixotropic admixture. Such a process produces a "second surface" print in which the glowing colors produced after activation of the thixotropic admixture are cleanly separated by solid black regions, which serve to enhance contrast. The device may then be viewed by looking through the clear substrate. Back printed substrates are known and are referred to as "sub surface" prints.

The thixotropic, chemiluminescent reactant composition thus comprises a first chemiluminescently reactive component in combination with an amount of first polymeric resin particles effective to yield a uniform dispersion, visualized as a viscus material. An amount of second polymeric resin particles in combination with the uniform dispersion in an amount effective to yield a thixotropic admixture is then provided. This thixotropic admixture may be screen printed or otherwise placed to form a specific shape. In a preferred embodiment, the first polymeric resin particles and second polymeric resin particles are each a polyvinyl chloride resin. Although an activator solution is commonly added to a composition to commence the emission of light, the oxalate and activator of the instant invention may be interchangeable. In such a case the first chemiluminescently reactive component might comprise an oxalate, and the second chemiluminescently reactive component might then comprise an activator. Optionally, the first chemiluminescently reactive component might comprise the activator and the second chemiluminescently reactive component might then comprise an oxalate.

In order to provide a chemiluminescent system, the second component must be included. Therefore, a chemiluminescent composition of the present invention comprises a first chemiluminescent reactant including a first chemiluminescently reactive component in combination with an amount of first polymeric resin particles effective to yield a uniform dispersion and an amount of second polymeric resin particles in combination with the uniform dispersion in an amount effective to yield a thixotropic admixture. A second chemiluminescent reactant component is included, wherein contact between the first and second chemiluminescent reactant components will result in the generation of light. The generation of light includes at least one distinct wavelength, within the visible or invisible spectrum.

A process for the production of a chemiluminescent reactant composition of the instant invention comprises providing a first polymeric resin, then combining a first chemiluminescently reactive component, typically in solution form, with an effective amount of the first polymeric resin to create a slurry. A second polymeric resin is provided which yields a thixotropic admixture.

This thixotropic admixture is significantly different than the liquid slurry taught in U.S. Pat. No. 5,173,218 in that it is not a liquid and will not seek its own level. The thixotropic admixture is also significantly different from the paste described in U.S. Pat. No. 3,816,325 in that it will neither sag nor slump. Significantly, this thixotropic composition has an intrinsically high degree of porosity and interconnecting, interstitial air spaces. Additionally, the thixotropic admixture has a plastic nature which permits it to be formed into definite, shapes by simply applying a force to the material sufficient to cause liquefaction and when force is removed, subsequent partial solidification. By way of example, the material may be placed by screen printing, or formed into a thin sheet by using doctor blades. Furthermore, the thixotropy exhibited by the mixture is sufficient to retain a desired shape after screen printing or placement with a doctor blade prior to curing.

Although PVC is the preferred polymeric resin, the polymeric composition is not limited thereto.

Various methods for shaping and/or processing are applicable to the chemiluminescent reactant composition of the present invention. Examples of such methods include, but are not limited to, screen printing, "doctoring", extrusion and similar processes. Additionally, the thixotropic admixture may be deposited manually through a process such as that used by painters when using heavy oil paints. Adhesion to any substrate as may be desired must be considered. If it is desirable to place the thixotropic composition on a substrate and then have that substrate be removable from the cured composition then the substrate must adhere poorly to the composition. If, however it is desirable to form a bond between the substrate and the cured thixotropic composition, then the substrate and the thixotropic composition must be capable of bonding. It has been found that one suitable substrate is polycarbonate plastic such as that supplied by GE Polymers and which is referred to as 8A35. This substrate permits good bonding to the thixotropic composition and is additionally, unaffected by the temperatures required to cure the thixotropic composition. Furthermore, this substrate is attacked relatively slowly by the chemicals in the activator solution used to "turn on" the light from the cured composition.

All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification. One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims.

The invention claimed is:

1. A chemiluminescent article comprising:
   a first chemiluminescent reactant component including a first chemiluminescent reactant solution and a first particulate resin in amounts effective to yield a uniform dispersion upon admixture thereof and a second particulate resin in an amount effective to yield a porous thixotropic composition defined as having liquid characteristics under shear forces, sufficient cohesive properties to permit formation into a desired shape without a mold in the absence of said shear force, and capable of forming a flexible mass upon addition of heat; and
   a second chemiluminescent reactant component separated from said first chemiluminescent reactant component;
   wherein contact between said first and second chemiluminescent reactant components will result in generation of chemiluminescent light.

2. The chemiluminescent article of claim 1, wherein said first chemiluminescent reactant component includes an oxalate and said second chemiluminescent reactant component includes an activator.

3. The chemiluminescent article of claim 2, wherein said first chemiluminescent reactant component includes an activator and said second chemiluminescent reactant component includes an oxalate.

4. The chemiluminescent article of claim 1 further comprising of a plurality of different dyes, fluorescent substances, or combinations thereof spatially separated in said chemiluminescent article wherein said different dyes, fluorescent substances, or combinations thereof are capable of generating different wavelengths of chemiluminescent light simultaneously over the surface of said chemiluminescent article.

5. The chemiluminescent article of claim 4 wherein said different dyes, fluorescent substances, or combinations thereof are separated by barriers.

6. The chemiluminescent article of claim 1 wherein said thixotropic composition is mounted on a substrate.

7. The chemiluminescent article of claim 6 further comprising a plurality of different dyes, fluorescent substances, or combinations thereof spatially separated in said chemiluminescent article wherein said different dyes, fluorescent substances, or combinations thereof are capable of generating different wavelengths of chemiluminescent light simultaneously over the surface of said chemiluminescent article.

8. The chemiluminescent article of claim 7 comprising a light stick, said light stick having an elongated sealed tubular transparent container enclosing said second chemiluminescent reactant component, said substrate inserted in said container whereby different colored chemiluminescent light is produced when said second chemiluminescent reactant component contacts said thixotropic composition.

9. A process for the production of a chemiluminescent article comprising the following steps:
    admixing a first chemiluminescent reactant solution with a first particulate polymeric resin in an amount effective to yield a uniform dispersion;
    admixing a second particulate polymeric resin with said uniform dispersion in an amount effective to yield a porous thixotropic composition defined as having liquid characteristics under shear forces, sufficient cohesive properties to permit formation into a desired shape without a mold in the absence of said shear force, and capable of forming a flexible mass upon addition of heat upon admixture with said uniform dispersion;
    providing a second chemiluminescent reactant solution, said second chemiluminescent reactant solution separated from said first chemiluminescent reactant solution; and
    curing said thixotropic composition by addition of heat to form a porous shape retaining form whereby adding a second chemiluminescent reactant solution to said shape retaining form results in chemiluminescent light.

10. The process for the production of a chemiluminescent article according to claim 9 wherein said first chemiluminescent reactant solution includes an oxalate and said second chemiluminescent reactant solution includes an activator.

11. The process for the production of a chemiluminescent article according to claim 9 wherein said first chemiluminescent reactant solution includes an activator and said second chemiluminescent reactant solution includes an oxalate.

12. The process for the production of a chemiluminescent article according to claim 9 further comprising the step of applying said thixotropic composition to a substrate to form a particular shape, curing said thixotropic material and said substrate to form a porous shape, wherein said thixotropic composition and said substrate are capable of subsequent manipulation.

13. The process for the production of a chemiluminescent article according to claim 9 further comprising coating said thixotropic composition on said substrate.

14. The process for the production of a chemiluminescent article according to claim 13 further comprising coating said thixotropic composition on said substrate by silk screen.

15. The process for the production of a chemiluminescent article according to claim 13 further comprising coating said thixotropic material on said substrate by doctor blade.

16. The process for the production of a chemiluminescent article according to claim 15 wherein said different colors are selected from a group consisting of dyes, fluorescent materials, or combinations thereof.

17. The process for the production of a chemiluminescent article according to claim 16 including providing barriers on said substrate between each of said different colors whereby said particular shape includes a plurality of different colored chemiluminescent light.

18. The process for the production of a chemiluminescent article according to claim 13 further comprising providing a plurality of said thixotropic compositions each of said plurality of thixotropic compositions having a different color, and coating said plurality of different colors on said substrate.

19. The process for the production of a chemiluminescent article according to claim 9 comprises providing a plurality of said thixotropic compositions, each of said plurality of said thixotropic compositions having a different color, and curing said thixotropic compositions to form a porous shape retaining form with a plurality of different colors, whereby adding a second chemiluminescent reactant solution results in a shape retaining form with different colored chemiluminescent light.

* * * * *